United States Patent
Briemle et al.

(10) Patent No.: US 11,425,544 B2
(45) Date of Patent: Aug. 23, 2022

(54) BACKEND APPARATUS FOR TRIGGERING AN AUTOMATIC EMERGENCY CALL FOR AT LEAST ONE VEHICLE, VEHICLE CONTROL UNIT FOR VEHICLE-TO-ENVIRONMENT COMMUNICATION, SYSTEM FOR TRIGGERING AN AUTOMATIC EMERGENCY CALL, METHOD FOR TRIGGERING AN AUTOMATIC EMERGENCY CALL, AND COMPUTER PROGRAM PRODUCT FOR A BACKEND APPARATUS

(71) Applicant: ZF Friedrichshafen AG, Friedrichshafen (DE)

(72) Inventors: Oliver Briemle, Friedrichshafen (DE); Lulevera Qorraj, Berg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/279,435

(22) PCT Filed: Sep. 13, 2019

(86) PCT No.: PCT/EP2019/074462
§ 371 (c)(1),
(2) Date: Mar. 24, 2021

(87) PCT Pub. No.: WO2020/064363
PCT Pub. Date: Apr. 2, 2020

(65) Prior Publication Data
US 2021/0409916 A1 Dec. 30, 2021

(30) Foreign Application Priority Data
Sep. 26, 2018 (DE) .................... 10 2018 216 492.4

(51) Int. Cl.
*H04W 4/40* (2018.01)
*G08B 25/01* (2006.01)
*G08G 1/16* (2006.01)

(52) U.S. Cl.
CPC ............ *H04W 4/40* (2018.02); *G08B 25/016* (2013.01); *G08G 1/163* (2013.01)

(58) Field of Classification Search
CPC ............................ H04W 4/40; G08B 25/016
See application file for complete search history.

(56) References Cited

U.S. PATENT DOCUMENTS

| 9,830,823 B1* | 11/2017 | Chainer ............... G08G 1/0133 |
| 2017/0072851 A1 | 3/2017 | Shenoy et al. |
| 2017/0268896 A1* | 9/2017 | Bai ....................... G08G 1/0141 |

FOREIGN PATENT DOCUMENTS

| DE | 19922730 A1 | 11/2000 |
| DE | 19753686 B4 | 3/2004 |

(Continued)

OTHER PUBLICATIONS

Search Report issued in German Patent Application No. DE 10 2018 216 492.4 dated May 16, 2019 (10 pages).

(Continued)

*Primary Examiner* — Qutbuddin Ghulamali
(74) *Attorney, Agent, or Firm* — Crowell & Moring LLP

(57) ABSTRACT

Backend apparatus for triggering an automatic emergency call for a vehicle is arranged outside the vehicle, comprising a first interface for vehicle-to-environment communication to recurrently obtain a current collision probability from a collision detection device for a collision with an object, a second interface for vehicle-to-environment communication to recurrently obtain a data record updated by the vehicle comprising a time, a location and an identification number of the vehicle. The backend apparatus is designed, if the impact probability is not obtained, and on the basis of the (Continued)

impact probability obtained last, to trigger the automatic emergency call comprising the data record obtained last. A third interface makes the automatic emergency call. The invention also relates to a vehicle control unit for a vehicle-to-environment communication, a system and method for triggering an automatic emergency call, and a computer program product for a backend apparatus.

5 Claims, 2 Drawing Sheets

(56) References Cited

FOREIGN PATENT DOCUMENTS

| DE | 102018216492 A1 | 3/2020 |
|---|---|---|
| EP | 3032516 A1 | 6/2016 |
| WO | WO 2020/064363 A1 | 4/2020 |

OTHER PUBLICATIONS

International Search Report and Written Opinions in priority application PCT/EP2019/074462 completed on Dec. 9, 20219, dated Dec. 17, 2019 (11 pages).

\* cited by examiner

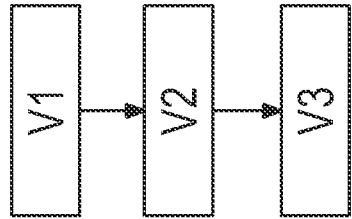
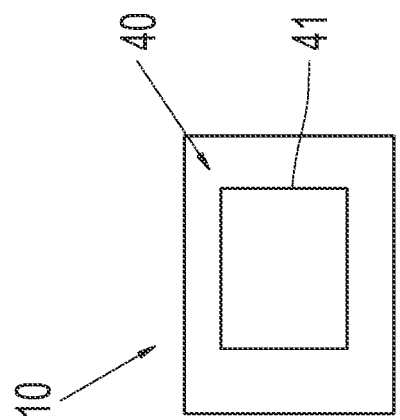
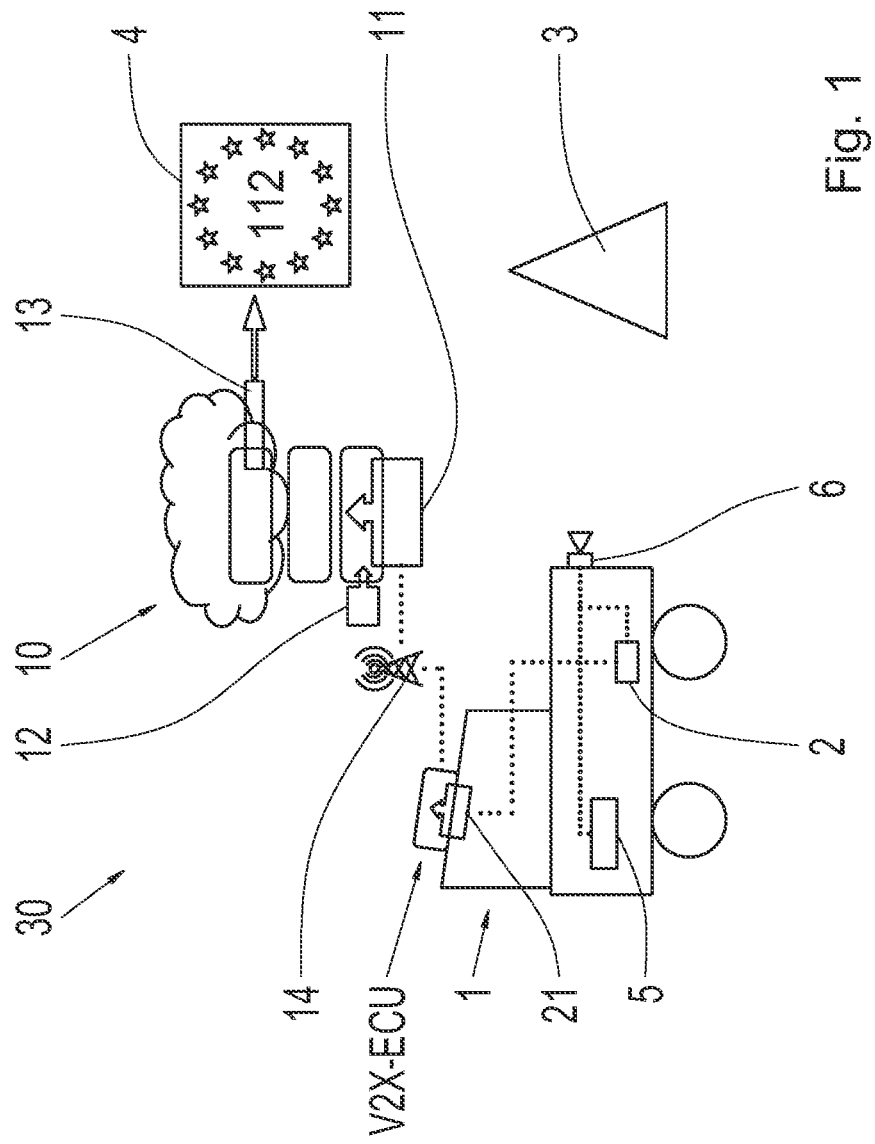

BACKEND APPARATUS FOR TRIGGERING AN AUTOMATIC EMERGENCY CALL FOR AT LEAST ONE VEHICLE, VEHICLE CONTROL UNIT FOR VEHICLE-TO-ENVIRONMENT COMMUNICATION, SYSTEM FOR TRIGGERING AN AUTOMATIC EMERGENCY CALL, METHOD FOR TRIGGERING AN AUTOMATIC EMERGENCY CALL, AND COMPUTER PROGRAM PRODUCT FOR A BACKEND APPARATUS

CROSS-REFERENCE TO RELATED APPLICATIONS

This application is a U.S. national stage application under 35 U.S.C. § 371 of PCT Application No. PCT/EP2019/074462 filed on Sep. 13, 2019, and published as WO 2020/064363 A1 on Apr. 2, 2020, which claims priority from German Application No. DE 10 2018 216 492.4, filed on Sep. 26, 2018, the entirety of which are each hereby fully incorporated by reference herein.

The invention relates to a backend device for triggering an automatic emergency call for at least one vehicle. The invention also relates to a vehicle control unit for vehicle-to-environment communication. The invention also relates to a system for triggering an automatic emergency call. The invention also relates to a method for triggering an automatic emergency call. The invention also relates to a computer program for a backend device.

EU regulation 2015/758 from the European Parliament and the Council of Apr. 29, 2015, published in the Official Journal of the European Union L123/77, stipulates the general requirements for EG approval of vehicles with regard to emergency call systems based on 112 emergency calls, as well as for emergency call systems based on 112 emergency calls and components and autonomous technological units. According to this regulation, OEMs must incorporate the emergency call system mandated by the European Union in all new passenger automobiles and light utility vehicles starting on Mar. 31, 2018.

The emergency call systems known from the prior art are on-board emergency call systems in vehicles, i.e. they are devices incorporated in the vehicle. One problem with known emergency call systems is that if the on-board emergency call system or the vehicle becomes damaged, a 112-emergency call cannot be triggered. Another problem with the known emergency call systems is that in minor accidents, with no serious impact, pseudo-emergency calls are made.

This is the basis for the invention. The fundamental object of the invention is to improve the known emergency call systems.

This object is achieved with a backend device that has the features as disclosed herein for triggering an automatic emergency call for at least one vehicle. The object is also achieved with a vehicle control unit that has the features as disclosed herein for vehicle-to-environment communication. The object is also achieved with a system that has the features as disclosed herein for triggering an automatic emergency call. The object is also achieved with a method that has the features as disclosed herein for triggering an automatic emergency call. The object is also achieved with a computer program that has the features as disclosed herein for a backend device.

Developments and advantageous embodiments are disclosed in the dependent claims and the figures.

According to the invention, a backend device is proposed for triggering an automatic emergency call for at least one vehicle. The backend device is located outside the vehicle. The backend device comprises a first interface. The first interface is configured for vehicle-to-environment communication, for periodic reception of a respective current collision probability from a collision detection device in the vehicle with regard to a collision with an object in the environment by the vehicle. The backend device also comprises a second interface. The second interface is configured for vehicle-to-environment communication, for periodic reception of a data set updated by the vehicle, comprising at least an actual time specification, an actual location of the vehicle, and the vehicle identification number. The backend device is configured to trigger the automatic emergency call when reception of the collision probability is interrupted, comprising the last received data set, and based on the last received collision probability. The backend device also comprises a third interface. The third interface is configured to send the automatic emergency call to an emergency call center.

The automatic emergency call is transmitted via a cellular network, preferably a public cellular network. The invention can be used for long term evolution (LTE) cellular technology. The concept of the invention can also be implemented with 5G technology. The backend device is part of a data transfer system, e.g. a cellular network, remote to the user, e.g. a vehicle driver or a vehicle. In this context, a user is also referred to as frontend. The backend device is a material component, e.g. a server memory or a central network component. The backend device can also be a cloud-based memory. The backend device is configured to carry out tasks involving processing large quantities of data. By way of example, the backend device triggers automatic emergency calls for numerous vehicles.

Vehicles are land vehicles, in particular passenger automobiles, small transporters, busses, trucks, and/or two-wheeled vehicles.

An interface connects at least two functional units for exchanging logical values, e.g. data, or physical values, e.g. electric signals, either unidirectionally or bidirectionally. The exchange can be analog or digital. The exchange is wireless. The connection is a radio connection, i.e. the exchange takes place via radio technology.

Vehicle-to-environment communication, or vehicle-to-X communication, abbreviated V2X, refers to the exchange of information and data between vehicles and their environment. In addition to other road users, the environment also comprises the infrastructure, in particular the traffic infrastructure. The traffic infrastructure comprises traffic control systems, e.g. traffic lights.

A collision detection device is a computing device that is configured to determine a collision probability in an accident scenario prior to the actual accident, also referred to as a pre-crash scenario in English, e.g. a collision between one vehicle and another vehicle, a pedestrian, or another object in the vehicle's environment, based on vehicle data and/or data from environment detection sensors in the vehicle and/or an anticipated trajectory derived therefrom. The collision detection device is configured to determine the collision probability continuously, or on the basis of a traffic event, e.g. an oncoming vehicle detected by a vehicle camera. The collision probability indicates the probability of the occurrence of such an accident event. Data evaluated by the collision probability device comprise, e.g. relative speeds between a vehicle and an object, the distance to an object, time to the collision, direction of movement of the vehicle (important on highways and in tunnels), impact location on the vehicle, classification of the object and/or severity of the collision (light collision to total damage). The collision detection device has a large computing capacity, in order to be able to determine collision probabilities within a few milliseconds. The collision detection device is preferably configured to predict a position of the vehicle from where a collision of the vehicle with an object is unavoidable based on a fusion of the data. This position is the point-of-no-return. Advantageously, the automatic emergency call is triggered for a predicted point-of-no-return. The collision detection device is preferably integrated in a vehicle control unit for a driver assistance system or for automated/autonomous driving, i.e. an electronic control unit for advanced driver assistance systems, abbreviated as an ADAS-domain-ECU. The ADAS-domain-ECU is preferably a supercomputing platform, which automatically/autonomously controls the longitudinal and/or lateral movement of the vehicle using artificial intelligence.

The data set updated by the vehicle is a minimum data set for describing the accident. Advantageously, the data set comprises additional information regarding the direction of travel, the severity of the accident, number of vehicle occupants, state of safety belts, and/or the state of the vehicle. The actual time specification and the actual location of the vehicle are the respective current time and vehicle location information. The vehicle can be clearly identified by the vehicle identification number.

If the backend device receives, e.g., a collision probability of 99.8% for total damage, and interrupts the connection to the vehicle, the backend device concludes that the vehicle has been totaled, and triggers the emergency call. The backend device determines the time and coordinates of the collision from the last received data set. As a result, an emergency call is triggered even if the vehicle is no longer capable of making an emergency call. By combining this with the collision probability, in particular the severity of the collision, pseudo-emergency notifications are prevented.

The emergency call center is a Public Safety Answering Point, PSAP. The emergency call center is called using the European emergency call number 112. The emergency call to the emergency call center means, in particular, that the emergency call is issued by means of the third interface in the backend device, and received by the emergency call center.

The backend device is advantageously designed to derive the extent of the consequences of the accident for the driver, passengers, and/or other participants in the accident, in order for the emergency call center to prepare appropriate rescue measures. By way of example, the backend device can derive from the data set that the driver is trapped by the accident in the interior of the vehicle. This information is received by the emergency call center. As a result, the ambulance responding to the alarm is equipped with the necessary extraction materials before it is sent to the accident. By way of example, in such an accident, an emergency rescue truck is automatically called in, equipped with hydraulic rescue tools, e.g. hydraulic spreaders.

The backend device is preferably designed for voice transmission via the internet. If a vehicle occupant is still able to speak at the time of, or after, the last collision probability was received, the backend device can establish voice communication with the emergency call center. Advantageously, the backend device comprises artificial intelligence means, e.g. for assessing the vehicle occupants and/or their states, via their voices.

The first interface is preferably an interface to a vehicle control unit for automated control of the vehicle. The vehicle control unit generates a perception of the environment based on data from environment detection sensors in the vehicle using artificial intelligence. The vehicle control unit comprises means for automated control of the vehicle based on the perception of the environment.

Environment detection sensor are sensors in driver assistance systems with which a vehicle's environment is detected, i.e. the area acting on the vehicle. Cameras, radars, lidars, ultrasonic sensors, and/or acoustic sensors are examples of environment detection sensors. In addition to the collision probability, the backend device also receives other advantageous information for identifying an accident regarding the vehicle's environment. The vehicle control unit is preferably an ADAS-domain-ECU.

The vehicle control unit according to the invention for vehicle-to-environment comprises an interface to a collision detection device in the vehicle. The collision detection device is configured to execute an algorithm that determines a collision probability for a collision with an object in the environment by the vehicle based on data from the environment detection sensors in the vehicle. The vehicle control unit is configured to provide the collision probability to the environment. The vehicle control unit is a V2X-ECU, and satisfies the technical specifications of the European Telecommunications Standards Institute (ETSI) and the standards IEE-E11609 for Wireless Access in Vehicular Environment (WAVE). By way of example, if the V2X-ECU is configured to maintain an acceleration of 65 g for a period of 100 ms. The V2X-ECU according to the invention also transfers results from the collision detection device via the interface to the collision detection device, i.e. not only raw data such as the steering angle and speed, but also collision probability.

The communication between the V2X-ECU and the backend device preferably takes place via a radio communication connection.

The vehicle control unit is preferably connected to the ADAS-domain-ECU as well.

The system for triggering an automatic emergency call for at least one vehicle according to the invention comprises a backend device and a vehicle control unit according to the invention. The vehicle control unit sends the collision probability to the backend device via the first interface. The backend device makes the emergency call to the emergency call center from outside the vehicle via the third interface. The system is the emergency call system specified in the corresponding EU regulation, and as such, satisfies the technical specifications for emergency call systems. The vehicle control unit provides the collision probability to the backend device by means of vehicle-to-environment communication, either in a direct connection between the vehicle control unit and the backend device, or by means of an interconnected transport layer, e.g. radio transmission antennas.

The method according to the invention for triggering an automatic emergency call for at least one vehicle from outside the vehicle comprises the following steps:

receiving a current collision probability from a collision detection device in the vehicle for a collision with an object in the vehicle's environment by the vehicle by means of vehicle-to-environment communication at a backend device, receiving a data set updated by the vehicle comprising at least an actual time specification, an actual location of the vehicle, and the vehicle identification number at a backend device, wherein the current collision probability and the updated data set are received periodically, and if reception of the collision probability is interrupted, and depending on the last received collision probability, triggering the automatic emergency call, comprising the data set last received by the backend device.

As a result, an emergency call is triggered even if a V2X-ECU or a vehicle is no longer able to trigger this emergency call itself, e.g. if it is damaged.

A backend device according to the invention or a system according to the invention is preferably used for executing the method.

The computer program according to the invention for a backend device for triggering an automatic emergency call for at least one vehicle is configured to be loaded in a memory in the backend device. The computer program product comprises software code segments with which the method according to the invention can be executed when the computer program runs on the backend device.

A program is a form of software in a data processing system, e.g. a computing unit, computer, or backend device. Software is a collective term for programs and associated data. The complement to software is hardware. Hardware refers to the mechanical and electronic components in a data processing system.

Computer programs normally comprise a series of commands, with which the hardware executes a specific process when the program is loaded, resulting in a specific result. When the program in question is used on the backend device, the computer program brings about a technological effect, specifically the triggering of an automatic emergency call, in particular an emergency call, if no more data have been received from the vehicle, and there is a particularly high probability of a collision.

The computer program according to the invention is not platform-specific. This means that it can be run on any computing platform.

The subject matter of the invention shall be explained in reference to the following figures by way of example. Therein:

FIG. 1 shows an exemplary embodiment of a system according to the invention,

FIG. 2 shows a schematic illustration of the method according to the invention,

FIG. 3 shows an exemplary embodiment of a computer program according to the invention.

Identical reference symbols indicate identical or functionally similar reference elements in the figures. For reasons of clarity, not all reference symbols are repeated in the individual figures, and instead, only the respective relevant reference symbols are used.

Figure 6:
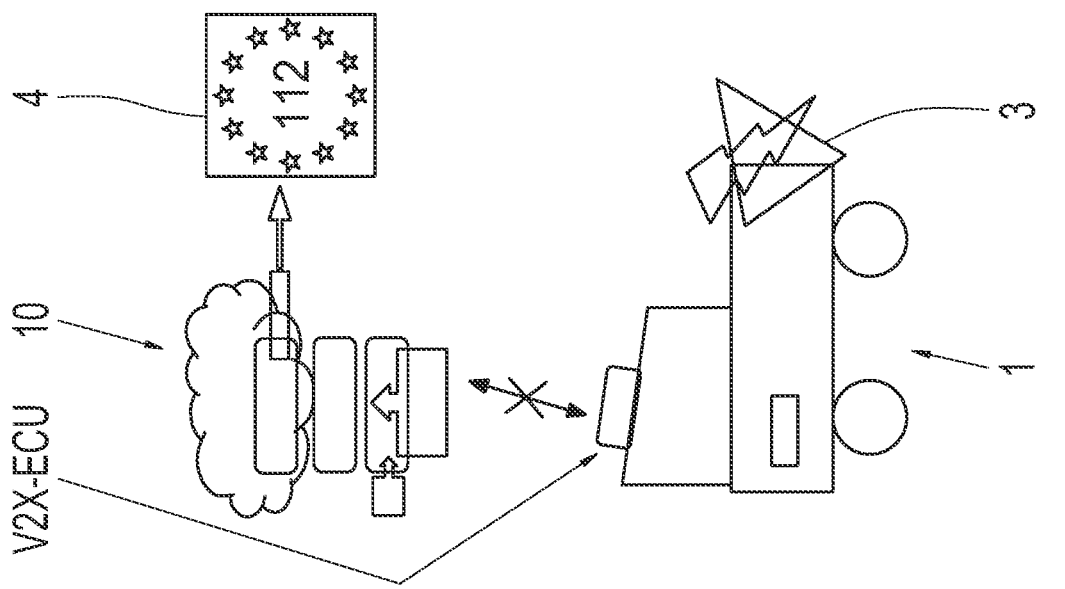
FIG. 6 shows an exemplary embodiment of the system in FIG. 1 used according to the invention.

The system 30 shown in FIG. 1 comprises a vehicle control unit V2X-ECU and a backend device 10 as components, which are claimed individually as components, and can be used individually.

The vehicle control unit V2X-ECU is an electronic control unit for vehicle-to-environment communication V2X and configured for LTE technology, with an upgrade to 5G technology. The vehicle control unit V2X-ECU is an on-board device in a vehicle 1. The vehicle control unit V2X-ECU is connected to a collision detection device 2 in the vehicle 1 via an interface 21. The collision detection device 2 determines a collision probability based on data from an environment detection sensor 6 and other vehicle data. The environment detection sensor 6 in FIG. 1 is an ADAS camera. The environment detection sensor 6 detects an object 3 in the vehicle's 1 environment while the vehicle 1 is underway, and specifically a current distance from the vehicle 1 to the object 3, and a current relative speed. The vehicle 1 also comprises a vehicle control unit 5. The vehicle control unit 5 is an ADAS-ECU, which processes data from the environment sensor 6 using artificial intelligence, e.g. an artificial neural network, in order to stipulate vehicle control commands, which are sent as signals to vehicle actuators. The collision detection device 2 is advantageously integrated in the vehicle control unit 5.

The vehicle control unit V2X-ECU periodically transmits the respective current collision probability while the vehicle 1 is underway to the backend device 10. The vehicle 1 also periodically transmits a respective current data set, comprising at least an actual time specification, an actual location of the vehicle 1, and the vehicle identification number, while the vehicle 1 is underway. The vehicle control unit V2X-ECU transmits these data directly to the backend device 10 or via interconnected antennas 14, as shown in FIG. 1.

The backend device 10 comprises a first interface 11. The first interface 11 receives the data from the vehicle control unit V2X-ECU. The backend device 10 also comprises a second interface 12. The second interface 12 receives the data set from the vehicle 1. The backend device 10 is a cloud-based computer. The backend device 10 also comprises a third interface 13. An automatic emergency call is triggered via the third interface 13 by means of calling the European emergency call number 112, when reception of the collision probability is interrupted. The triggering also takes place based on the last received collision probability. The last data set received from the vehicle 1 is then sent to an emergency call center 4.

The method for triggering an automatic emergency call for the at least one vehicle is shown in FIG. 2. The method is carried out with the system 30. In a first step V1, the backend device receives a current collision probability from the collision detection device 2 in the vehicle 1 for a collision with an object 3 in the vehicle's environment by the vehicle. The collision probability is sent by the vehicle control unit V2X-ECU by means of vehicle-to-environment communication to the backend device 10. In a second step V2, the backend device 10 receives a data set updated by the vehicle 1. The data set comprises at least an actual time specification, an actual location of the vehicle 1, and the vehicle identification number. The current collision probability and the updated data set are received periodically while the vehicle is underway. In a third step V3, in which reception of the collision probability is interrupted, the backend device 10 triggers the automatic emergency call, comprising the last received data set, based on the last received collision probability.

FIG. 3 shows the computer program 40 according to the invention, which is carried out in a memory 41 in the backend device 10. The computer program 40 is programed such that the method shown in FIG. 2 is executed when the program runs on the backend device 10. The computer program 40 thus automatically triggers an emergency call.

Figure 4:
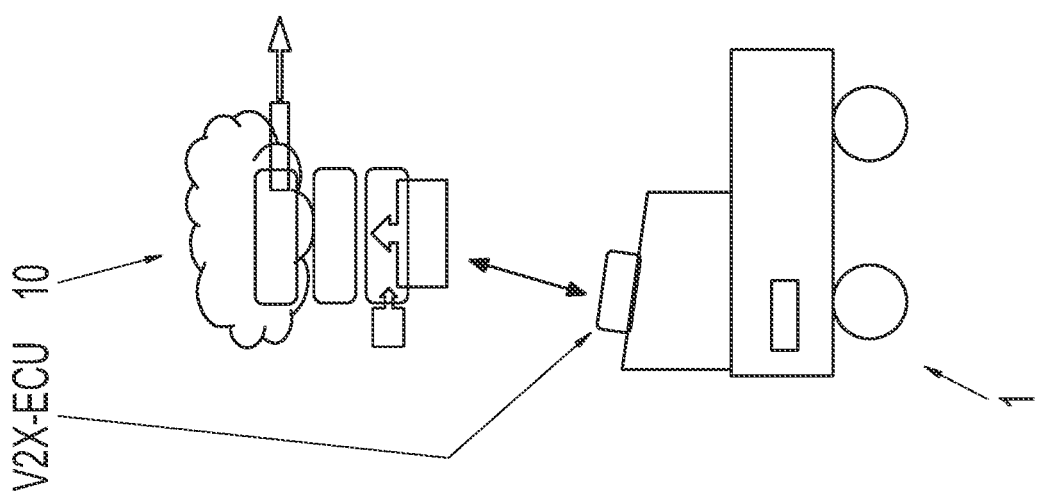
FIG. 4 shows an exemplary embodiment of the system in FIG. 1, in normal operation.

FIG. 4 shows the system 30 in a normal state, in which the vehicle control unit V2X-ECU communicates with the backend device 10 by means of vehicle-to-environment communication.

Figure 5:
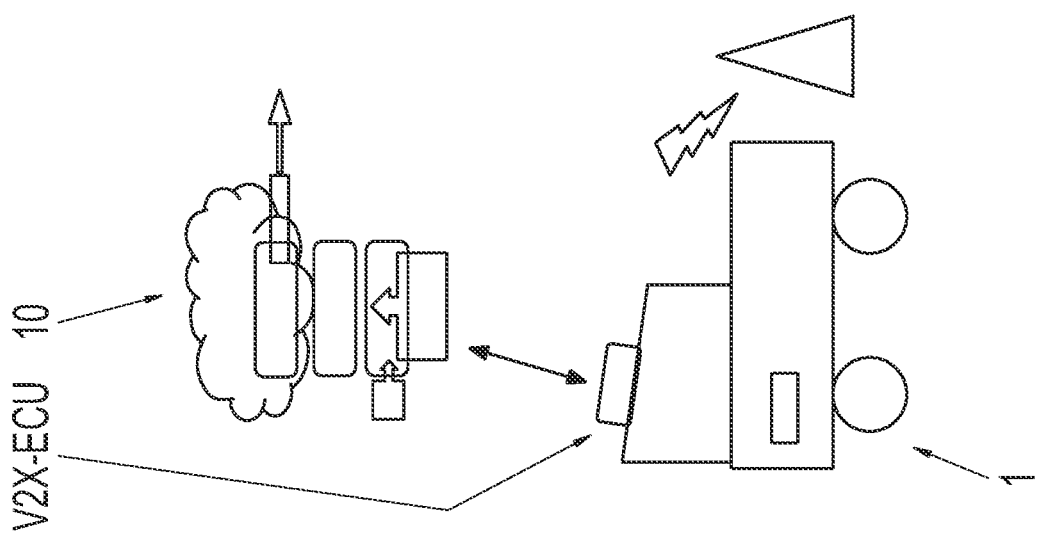
FIG. 5 shows an exemplary embodiment of the system in FIG. 1, in a pre-crash state.

The system 30 is in a pre-crash situation in FIG. 5. The collision probability determines that the probability that the vehicle will be totaled is 99.8%. The collision probability of 99.8% is then sent with the associated data set from the vehicle 1 to the backend device 10 by means of the vehicle control unit V2X-ECU. The backend device 10 receives the collision probability, and concludes that a collision is highly probable.

The vehicle has been totaled in FIG. 6. The vehicle has had a font-end collision with the object 3, and can no longer function. The vehicle-to-environment communication V2X between the vehicle control unit V2X-ECU and the backend device 10 is interrupted. The backend device 10 no longer periodically receives data from the vehicle control unit V2X-ECU. The backend device 10 concludes therefrom, and from the last received collision probability of 99.8%, that a collision has occurred. The backend device 10 then automatically triggers an emergency call to an emergency call center. The conditions necessary for automatically triggering the emergency call are the detection of an unavoidable accident and interruption of the communication between the vehicle control unit V2X-ECU and the backend device 10.

REFERENCE SYMBOLS 1 vehicle
2 collision detection device
3 object
4 emergency call center
5 vehicle control unit
6 environment detection sensor
10 backend device
11 first interface
12 second interface
13 third interface
14 antenna
21 interface
30 system
40 computer program
41 memory
V2X vehicle-to-environment communication
V2X-ECU vehicle control unit
V1-V3 steps of the method

The invention claimed is:

1. A backend device for triggering an automatic emergency call for at least one vehicle, wherein the backend device is located outside the vehicle, the backend device comprising:
a first interface configured to:
conduct vehicle-to-environment communication; and
periodically receive a respective current collision probability of a collision detection device in the vehicle for a collision with an object in the environment by the vehicle;
a second interface configured to:
conduct vehicle-to-environment communication; and
periodically receive a data set updated by the vehicle comprising at least an actual time specification, an actual location of the vehicle, and a vehicle identification number; and
a third interface configured to make the automatic emergency call to an emergency call center;
wherein the backend device is configured to trigger the automatic emergency call via the third interface, the automatic emergency call comprising a last received data set via the second interface in response to reception of the collision probability by the first interface being interrupted and based on a last received collision probability.

2. The backend device according to claim 1, configured for voice transmission via the internet.

3. The backend device according to claim 1, wherein the first interface is an interface to a vehicle control unit for automated control of the vehicle, which generates a perception of the environment based on data from environment detection sensors in the vehicle using artificial intelligence, and performs automated control of the vehicle based on the perception of the environment.

4. The backend device according to claim 1, wherein
the first interface comprises an interface to a vehicle control unit,
wherein the vehicle control unit is configured to send the collision probability to the backend device via the first interface of the backend device, and
wherein the backend device is configured to send the automatic emergency call from outside the vehicle to the emergency call center via the third interface.

5. A method comprising:
receiving, by a backend device via a vehicle-to-environment communication, a current collision probability from a collision detection device in a vehicle for a collision with an object in the vehicle's environment by the vehicle;
receiving, by the backend device from the vehicle, a data set updated by the vehicle, the data set comprising at least an actual time specification, an actual location of the vehicle, and the vehicle identification number, wherein the current collision probability and the updated data set are received periodically; and
when reception of the collision probability is interrupted, and dependent on a last received collision probability, triggering an automatic emergency call comprising data set last received by the backend device.

* * * * *